3,459,859
DIHYDRODIBENZOCYCLOHEPTENE CARBOXYLIC ACID AMIDES USEFUL AS ANTICONVULSANTS
Frederick Leonard, 14103 Gaines Ave., Rockville, Md. 20853
No Drawing. Original application July 30, 1962, Ser. No. 213,156. Divided and this application Oct. 20, 1965, Ser. No. 498,996
Int. Cl. A61k 27/00
U.S. Cl. 424—246  4 Claims This application is a division of application, Ser. No. 213,156, filed July 30, 1962, now abandoned.

This invention relates to certain novel derivatives of 5H - dibenzo[a,d]cycloheptene (dibenzo[a,e]cycloheptatriene) and 10,11-dihydro-5H-dibenzo[a,d]cycloheptene (dibenzo[a,d]cyclohepta-1,4-diene), which posses valuable pharmacological properties and are useful as pharmaceutical agents. This invention also pertains to processes for their manufacture.

More particularly, this invention resides in basic alkyl esters and amides of 5H-dibenzo[a,d]cycloheptane- and 10,11 - dihydro-5H-dibenzo[a,d]cycloheptene-5-carboxylic acid which may be represented by the following general formula:

I
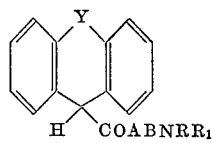
H  COABNRR₁ wherein:
Y stands for the ethylene or vinylene group
—CH$_2$CH$_2$— or —CH=CH— respectively,
A represents O or NH,
B stands for lower alkylene,
R and R$_1$ are hydrogen or lower alkyl,
NRR$_1$ is a heterocyclic moiety, such as pyrrolidino, piperidino, piperazino, N-(lower)alkyl-piperazino, morpholino, thiomorpholino.

The term "lower alkyl" as used herein means saturated monovalent aliphatic radicals of the general formula —C$_m$H$_{2m+1}$ wherein $m$ designates an integer of less than 6 is inclusive of both straight chain and branched chain radicals.

The term "lower alkylene" as used herein means saturated divalent aliphatic groups of the general formula —C$_n$H$_{2n}$— wherein $n$ designates an integer of from 2 to 6 and is inclusive of both straight and branched chain radicals.

Briefly, the compounds of this invention may be synthesized readily by reacting carboxylic acids or acid halides of the formula:

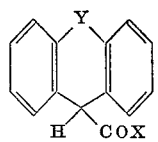
H  COX wherein X represents hydroxy or halogen, particularly chlorine of bromine, and Y has the definition ascribed to it hereinabove with a di- or mono(lower)alkylamino- or heterocyclic lower alkanol or -lower alkyl halide of the formula:

ZBNRR₁ wherein Z is OH or halogen, particularly chlorine or bromine and B, R, R$_1$ and NRR$_1$ have the meanings given to them above.

More specifically, the subject compounds may be made by the following modes of preparation:

A. 5-carboxylate derivatives

Such compounds may be formed by refluxing the above defined 5-carboxylic acids with a basically substituted lower alkyl halide in a lower alkanoic medium furnished, e.g. by methanol, ethanol, propanol, etc., from about 2 hours to about 20 hours and preferably, for about 12 hours.

Alternatively, such 5-carboxylate derivatives are prepared by refluxing an acid halide as defined above with a basically substituted lower alkanol in a reaction medium such as is provided by benzene, chloroform, carbon tetrachloride, carbon disulfide, etc. for from about 1 hour to about 20 hours and preferably for about 2 hours.

5-carboxylate derivatives of Formula I wherein R is hydrogen and R$_1$ represents lower alkyl may be prepared in several ways. For instance, treatment of an acid halide as defined above, with a secondary amino(lower)alkanol in a reaction medium constituted by such solvents as benzene, chloroform carbon tetrachloride, carbon disulfide, etc. lasting for from about 1 hour to about 20 hours and preferably for about 4 hours, yields an N-(lower)alkyl-N-hydroxy(lower)alkyl-5H-dibenzo[a,d]cycloheptene- or 10,11 - dihydro - 5H-dibenzo[a,d]cycloheptene-5-carboxamide which when subjected to concentrated hydrochloric acid is converted to the desire mono(lower)alkylamino (lower)alkyl esters.

Alternatively, dealkylation of a 5-carboxylate derivative of Formula I wherein R and R$_1$ are alkyl gives the desired mono(lower)alkylamino(lower)alkyl esters, as for instance by treatment with ethyl chlorocarbonate to form a urethane derivative which upon saponification gives the desired dealkylated compound.

Further, such mono(lower)alkylamino(lower)alkyl esters can also be obtained by hydrogenolysis of a 5-carboxylate derivative of Formula I where, however, R$_1$ represents benzyl in the presence of a noble metal catalyst, such as, palladium on charcoal, platinum, etc.

B. 5-carboxamide derivatives

These compounds are made by refluxing the carboxylic acid chlorides, mentioned above, with an appropriately substituted lower alkylene diamine, in a reaction medium exemplified by benzene, chloroform, carbon tetrachloride carbon disulfide, etc. for about 1 hour to about 20 hours and preferably about 2 hours.

5-carboxamide derivatives of Formula I wherein R is hydrogen and R$_1$ represents lower alkyl can be synthesized by using the above-described treatment with ethyl chlorocarbonate of compounds of Formula I wherein both R and R$_1$ are lower alkyl and by saponification of the intermediates obtained or hydrogenolysis of compounds of Formula I wherein R$_1$ represents benzyl in the presence of noble metal catalysts.

The starting materials are either commercially available, as for example, the above mentioned alkyl halides, alkanols and diamines or, as in the case of the above identified 5-carboxylic acid and 5-carboxylic acid halide derivatives, can be readily prepared in accordance with the following syntheses:

(1) Benzylidene-phthalic anhydride prepared from phthalic anhydride phenylacetic acid according to Org. Synth., Coll., vol. 2, J. Wiley, New York, 1943, p. 61, is hydrogenated in absolute dioxane in the presence of a Nickel-catalyst until the hydrogenation is completed and 2-phenylethyl benzoic acid is obtained.

(2) To this benzoic acid derivative 85 percent polyphosphoric acid is added at about 100° C. The reaction mixture is then stirred for about 2 hours. 10,11-dihydro-5H-dibenzo[a,d]cycloheptene-5-one is obtained in consequence of this procedure.

(3) By adding sodium in absolute ethanol to this ketone under dry nitrogen with vigorous stirring, 10,11-dihydro-5H-dibenzo[a,d]cycloheptene is formed after refluxing for about ½ hour to about 4 hours and preferably for about 1 hour, (4a) The desired carboxylic acid 10,11-dihydro-5H-dibenzo[a,d]cycloheptene-5-carboxylic acid is made by adding butyllithium in wax to a mechanically stirred solution of the reaction product of step three in absolute ether under dry oxygen-free nitrogen, refluxing the reaction mixture for about ½ hour to about 4 hours and then adding carbon dioxide to the reaction mixture.

(4b) The desired 5H-dibenzo[a,d]cycloheptent-5-carboxylic acid is obtained, for example, by (1) brominating the product of step three by means of N-bromo-succinimide in the presence of benzoyl peroxide dissolved in carbon tetrachloride under reflux conditions, (2) dehydrobrominating the compound obtained by heating with pyridine and (3) treating the 5H-dibenzo[a,d]cycloheptene thus formed as described under 4(a) above.

5. By treating the above carboxylic acids with, for example, thionyl halides or phosphorous halides, the corresponding 5-carboxylic acid halide derivatives are obtained which can be converted to the 5-carboxamide derivatives by treatment with ammonia.

The present invention comprehends not only the above-described derivatives of 5H-dibenzo[a,d]cycloheptene and 10,11-dihydro-5H-dibenzo[a,d]cycloheptene in their free base form, but it also includes pharmaceutically acceptable non-toxic acid addition salts which may be formed from said compounds in accordance with conventional practice, by using appropriate inorganic and organic acids, such as hydrohalic acids, especially hydrochloric and hydrobromic acids, sulfuric, methanesulfonic and phosphoric acids as well as acetic, aminoacetic, lactic, succinic, malic, aconitic, phthalic and tartaric acids.

The quaternary ammonium salts of compounds of the present invention, which are pharmaceutically acceptable, can be obtained by addition to the corresponding free bases of alkyl or aralkyl esters of inorganic sulfonic acids, including such compounds as methyl chloride, methyl bromide, methyl iodide, ethyl bromide, propyl bromide, octyl bromide, benzyl chloride, benzyl bromide, methyl sulfate, methyl benzenesulfonate, and methyl-p-toluenesulfonate, giving the methochloride, methobromide, methoiodide, ethobromide, propobromide, octobromide, benzochloride, benzobromide, methosulfate, methobenzenesulfonate, and metho-p-toluene sulfonate salts, respectively.

As mentioned above, the subject compounds possess valuable pharmacological properties; they exhibit anticonvulsant, spasmolytic and anti-epileptic activity and can thus be used as anticonvulsant, spasmolytic and anti-epileptic agents in the treatment of warm-blooded animals. They also are effective local anesthetic agents.

Merely by illustration, 2-diethylaminoethyl 10,11-dihydro - 5H - dibenzo[a,d]cyclohepten-5-carboxylate hydrochloride provides for example, when administrated to mice in doses of 100 mg./kg., p.o., 100% protection against electro-shock for more than 4½ hours and delays at the same dose the onset of convulsions and death brought about by metrazole.

As is obvious to those skilled in the art the subject compounds can be administered perorally, intravenously, intraperitorilly, etc. as pharmaceutical compositions in conventional dosage unit form comprising a pharmaceutically effective amount of the active ingredients. This may be within the range of about 2 mg. to about 500 mg.

Useful pharmaceutical formulations for administration of the compounds of this invention may be illustrated as follows:

| Capsules: | Mg. |
|---|---|
| Active ingredient | 10–500 |
| Lactose | 20–100 |
| Corn starch, U.S.P. | 20–100 |
| Aerosolized silica gel | 2–4 |
| Magnesium stearate | 1–2 |

| Tablets: | Mg. |
|---|---|
| Active ingredient | 100 |
| Microcrystalline cellulose | 50 |
| Corn starch, U.S.P. | 80 |
| Lactose, U.S.P. | 50 |
| Magnesium stearate, U.S.P. | 2 |

| Chewable tablets: | Mg. |
|---|---|
| Active ingredient | 100 |
| Mannitol, N.F. | 100 |
| Flavor | 1 |
| Magnesium stearate, U.S.P. | 2 |

| Suppositories: | Mg. |
|---|---|
| Active ingredient | 100 |
| Suppository base | 1900 |

| Liquid: | Percent |
|---|---|
| Active ingredient | 2.0 |
| Polyethylene glycol 300, N.F. | 10.0 |
| Glycerin | 5.0 |
| Sodium bisulfite | 0.02 |
| Sorbitol solution 70%, U.S.P. | 50.0 |
| Methylparaben, U.S.P. | 0.1 |
| Propylparaben, U.S.P. | 0.2 |
| Distilled water, U.S.P., qs., 100.0 cc. | |

Injectable:
| | | |
|---|---|---|
| Active ingredient | mg | 25.0 |
| Polyethylene glycol 600 | cc | 1.0 |
| Sodium bisulfite, U.S.P. | mg | 0.4 |
| Water for injection, U.S.P., qs., 2.0 cc. | | |

The new compounds, and the methods for their preparation may be exemplified more fully by the following illustrative examples. The temperatures therein are given in degrees centigrade.

EXAMPLE I 2-dimethylaminoethyl 10,11 - dihydro-5H-dibenzo[a,d]-cycloheptene-5-carboxylate hydrochloride (1) 2 - (phenylethyl) - benzoic acid.—Benzylidene-phthalic anhydride (33 g., 1.5 moles) prepared according to Org. Synth. Coll., vol. 2, J. Wiley, New York, 1943, p. 61, was hydrogenated in 250–300 ml. of absolute dioxane, obtained peroxide-free by chromatography on basic aluminum ovide, in the presence of 60 g. Girdler stabilized nickel-catalyst. The starting hydrogen pressure was 1700 p.s.i. at 25° a C., corresponding to 2880 p.s.i. at 400° K. After shaking for 3 hours at the latter temperature the pressure was 1330 p.s.i., corresponding to a hydrogen uptake of 92%. The crude, crystalline reaction mixture was washed out with absolute dioxane, filtered through Celite and evaporated. Dissolving the resulting residue in 5 N ammonia-water, filtration and precipitation with conc. HCl at 0° under vigorous stirring resulted in 265 g. of slightly beige crystals, M.P. 118–125°; $\nu(CCl_4)$ C=O 1770 and 1690 cm.$^{-1}$. Recrystallization from ether/pentane gave 249 g. of pure phenylethylbenzoic acid; M.P. 128–130°, $\nu(CCl_4)$ C=O 1760 cm.$^{-1}$, $\epsilon(MeOH)$ 2780 A., 1300, equivalent weight calc. 226, found 227.

(2) 10,11 - dihydro - 5H - dibenzo[a,d]cycloheptene-5-one.—2-(phenylethyl)-benzoic acid (90.4 g., 0.4 mole) was added to 4 kg. of 85% polyphosphoric acid at 100°. After stirring at this temperature for 2 hours the reaction mixture was poured on 4 kg. ice with stirring and extracted with three 1 l. portions of ether. The combined extracts were washed twice with 500 ml. of 2 N $Na_2CO_3$, thrice with 500 ml. of ice-water, dried over anhydrous MgSO₄ and evaporated. Distillation of the brown residue yielded 70 g. of the desired ketone, B.P. 0.4, torr 145°, $n_D{}^{25}$ 1.6330–1.6332; M.P. 32–33° (from MeOH at 0°), $\nu$(liq.) C=O 1650 cm.⁻¹; $\epsilon$(MeOH) 2670 A., 16,000, $\epsilon$(cyclohex.) 2630 A., 18,000 $\epsilon$(isooctane) 2640 A., 16,600.

(3) 10,11 - dihydro - 5H - dibenzo[a,d]cycloheptene.—Sodium (46.0 g., 2.0 moles) was added to 45.0 g. (0.216 mole) of the above ketone in 900 ml. absolute ethanol under dry nitrogen with vigorous stirring. After refluxing for 30 min. the reaction mixture was cooled, treated with 1 l. of icewater and extracted with two 1. portions of ether. The organic phase was then washed twice with 1 l. water, dried over MgSO₄ and evaporated. Crystallization of the residue from ethanol yielded 29.56 g. of the desired reaction product; M.P. 72–75°.

(4a) 10,11 - dihydro - 5H - dibenzo[a,d]cycloheptene-5-carboxylic acid.—Butyl - lithium (44.0 g., 0.136 mole, 20.0%) in wax was added to a magnetically stirred solution of 22.4 g. (0.115 mole) of the above cycloheptene in 250 ml. absolute ether under dry, oxygen-free (Fieser-solution) nitrogen. After heating to reflux for 1.5 hours the brown mixture was added to 300 g. finely crushed $CO_2$ under vigorous stirring and simultaneous addition of 500 ml. of absolute ether. Stirring was continued on a waterbath for 30 min., after which all the $CO_2$ had evaporated. Addition of 300 ml. of 0.4 N $Na_2CO_3$ solution was followed by washing with three 250 ml. portions of ether. Separation and acidification of the aqueous phase with ice cold 2 N HCl under 500 ml. ether, extraction with another 500 ml. of ether, drying of the organic phase over MgSO₄, evaporation and recrystallization from CHCl₃/pentane gave 17.95 g. of the desired carboxylic acid; M.P. 215–218°, $\nu$KBr C=O, 1690 cm.⁻¹.

(4b) 10,11 - dihydro-5H-dibenzo[a,d]cycloheptene-5-carboxylic acid chloride.—The above carboxylic acid (2.38 g., 0.01 mole) was refluxed in 20 ml. of thionyl chloride with magnetic stirring under argon for one hour. After evaporation to dryness and recrystallization from pentane, 2.0 g. of the desired acid chloride was obtained; M.P. 64–65°, C=O, CHCl₃ 1800, 1775 cm.⁻¹, CDCl₃ 3.02 (8H), 5.08 (1H), 7.04 (4H).

(5) 2-dimethylaminoethyl 10,11 - dihydro - 5H - dibenzo[a,d]cycloheptene - 5 - carboxylate hydrochloride.—10,11 - dihydro-5H-dibenzo[a,d]cycloheptene-5-carboxylic acid (11.9 g., 0.05 mole) was dissolved in 200 ml. of benzene. To the solution was added 50 ml. of thionyl chloride. The mixture was refluxed for 18 hours and then concentrated in vacuo to an oily residue which was taken up in benzene and again concentrated to a syrup. The syrup was dissolved in 100 ml. of benzene and 4.4 g. (0.05 mole) of dimethyl-aminoethanol in 50 ml. of benzene was added dropwise at room temperature. The reaction was stirred and refluxed for 4 hours. The reaction mixture was cooled and the desired compound was filtered off as white crystals. After recrystallization from ethanol it melted at 210–212°. Yield: 7 g.

*Analysis.*—For $C_{20}H_{24}ClNO_2$. Calc'd: C, 69.47; H, 6.99; N, 4.05. Found: C, 69.39; H, 7.04; N, 4.08.

EXAMPLE II 2-(10,11 - dihydro - 5H - dibenzo[a,d]cycloheptene-5-carboxy)ethyldimethyloctylammonium bromide 2-dimethylaminoethyl 10,11 - dihydro - 5H - dibenzo[a,d]-cycloheptene-5-carboxylate hydrochloride (5 g.) was dissolved in 15 ml. of water. The solution was cooled to 5°, the pH adjusted to 10 with 10% NeOH and the liberated oil was extracted with ether. The ether extract was dried over anhydrous Na₂SO₄. Concentration of the dried extract gave 4 g. of 2-dimethylaminoethyl 10,11-dihydro-5H-dibenzo[a,d]cycloheptene-5-carboxylate.

2-dimethylamino 10,11 - dihydro - 5H - dibenzo[a,d] cycloheptene - 5 - carboxylate (4 g.) was dissolved in 100 ml. of dry acetone. To the solution was added the equivalent amount of octyl bromide (2.8 g.). The mixture was refluxed for 28 hours and then concentrated. The oily residue that was obtained crystallized on addition of ether (cooling). After recrystallization from a mixture of ethyl acetate and ether, the desired ammonium salt melted at 85–87°; yield: 2.5 g.

*Analysis.*—For $C_{28}H_{40}BrNO_2$. Calc'd: C, 66.95; H, 8.19; N, 2.78. Found: C, 67.24; H, 8.21; N, 3.01.

EXAMPLE III 2-diethylaminoethyl 10,11-dihydro-5H-dibenz[a,d] cycloheptene-5-carboxylate hydrochloride The carboxylic acid of Example I, 4(a) (10.70 g., 0.045 mole) and 6.10 g. (0.045 mole) of 2-diethylaminoethyl chloride in 90 ml. of dry isopropanol were heated to reflux for 12 hours. Upon cooling in ice the reaction product (16.47 g.) precipitated. After recrystallization from the same solvent and washing with absolute ether and drying, the desired compound melted at 195–197°, $\nu$KBr C=O 1740 cm.⁻¹.

*Analysis.*—For $C_{22}H_{28}ClNO_2$: Calc'd: C, 70.66; H, 7.56; N, 3.75. Found: C, 70.35; H, 7.77; N, 3.49.

EXAMPLE IV 2-(10,11-dihydro-5H-dibenzo[a,d]cycloheptene-5-carboxy)ethyl-diethylmethylammonium iodide The compound of Example III (7.90 g., 0.21 mole) was dissolved in 25 ml. 2 N ice cold NaOH and extracted thrice with 100 ml. ether. The combined extracts were dried over K₂CO₃, evaporated to 50 ml. and treated dropwise with 3.12 ml. (0.05 mole) freshly distilled methyl iodide in 50 ml. of absolute ether at 0° under vigorous stirring. The resulting precipitate, 7.89 g. of white crystals was filtered and recrystallized from acetone and ether, M.P. 156–158°, $\nu$KBr C=O 1740 cm.⁻¹.

*Analysis.*—For $C_{23}H_{30}INO_2$. Calc'd: C, 57.70; H, 6.31; N, 2.92. Found: C, 57.68; H, 6.46; N, 2.82.

EXAMPLE V

N - 2 - (diethylaminoethyl)-10,11-dihydro-5H-dibenz[a,d] cycloheptene - 5 - carboxamide hydrochloride monohydrate The carboxylic acid of Example I, 4(a) (9.2 g., 0.04 mole) was dissolved in 160 ml. of benzene and treated slowly with 20 ml. of thionyl chloride. The mixture was refluxed for 18 hours and concentrated to a syrupy residue in vacuo, which was taken up in benzene and again concentrated to a syrup. The syrup was dissolved in 100 ml. of benzene and 4.7 g. (0.04 mole) of N,N-diethylethylenediamine in 500 ml. of benzene were added dropwise at room temperature. The reaction mixture was stirred and refluxed for 4 hours. Upon cooling crystals separated, which, after recrystallization from a mixture of isopropanol and ethanol (8:2) melted at 133–135°; yield: 6.7 g.

*Analysis.*—For $C_{22}H_{31}ClN_2O_2$. Calc'd: C, 67.76; H, 8.00; N, 7.16. Found: C, 67.79; H, 8.35; N, 7.00.

EXAMPLE VI 3-diethylaminopropyl 10,11-dihydro-5H-dibenzo[a,d] cycloheptene-5-carboxylate hydrochloride The carboxylic acid of Example I, 4(a) (8 g., 0.033 mole) was dissolved in 100 ml. of benzene. To the solution was added 30 ml. of thionyl chloride. The mixture was refluxed for 18 hours, and then concentrated in vacuo to an oily residue which was taken up in benzene and again concentrated to a syrup. The syrup was dissolved in 50 ml. of benzene and treated with 4 g. (0.033 mole) of 3-diethylamino-1-propanol in 25 ml. of benzene, added dropwise at room temperature. The reaction was stirred and refluxed for 3.5 hours. The reaction mixture was cooled and diluted with 100 ml. of ether. A mixture of gum and crystals precipitated. The mixture of solvents was decanted and the residue was crystallized from ethyl acetate. The crystalline product melted at 147–148°; yield: 3.5 g.

*Analysis.*—For $C_{23}H_{30}ClNO_2$. Calc'd: C, 71.19; H, 7.79; N, 3.61. Found: C, 70.83; H, 8.16; N, 3.76.

EXAMPLE VII 3-diethylamino-2-propyl 10,11-dihydro-5H-dibenzo[a,d] cycloheptene-5-carboxylate The carboxylic acid of Example I, 4(a) (4 g.) was dissolved in 50 ml. of benzene and treated slowly with 10 ml. of thionyl chloride. The mixture was refluxed for 18 hours and concentrated to a syrupy residue in vacuo which was taken up in benzene and again concentrated to a syrup. The syrup was dissolved in 50 ml. of benzene and cooled to 15°. 1-diethylamino-2-propanol (3.9 g.) in 25 ml. of benzene was then added dropwise. The reaction mixture was stirred and refluxed for 24 hours, cooled and treated with 50 ml. of 0.1 N sodium hydroxide. The benzene layer was separated, washed with 50 ml. of cold water, dried over $Na_2SO_4$ and evaporated. The residue was distilled and the fraction which distilled at 125–130°/0.15 mm. was collected. Yield: 1.1 g.

*Analysis.*—For $C_{23}H_{29}NO_2$. Calc'd: C, 78.61; H, 8.32; N, 3.98. Found: C, 78.57; H, 8.22; N, 3.94.

EXAMPLE VIII 2-(1-piperidylethyl) 10,11-dihydro-5H-dibenzo[a,d]cycloheptene-5-carboxylate hydrochloride monohydrate The carboxylic acid of Example I, 4(a) (4 g., 0.016 mole) was dissolved in 50 ml. of benzene and treated slowly with 10 ml. of thionyl chloride. The mixture was refluxed for 18 hours and concentrated to a syrupy residue in vacuo. The residue was taken up in benzene and again concentrated to a syrup. The syrup was dissolved in 50 ml. of toluene, cooled to 5° C. and treated dropwise with 3.8 g. (twice amount) of N-β-hydroxyethyl piperidine in 25 ml. of toluene. The reaction mixture was stirred and refluxed for 4 hours, cooled and treated with 50 ml. of water. The toluene layer was separated, washed with 50 ml. of cold water, dried over $Na_2SO_4$ and evaporated to an oily residue. The oil was dissolved in ethyl acetate and treated (heat) with charcoal. After filtration, the ethyl acetate solution was concentrated and a mixture of oil and crystals was obtained which, after crystallization from ethyl acetate gave the desired compound which melted at 104–105°; yield: 0.7 g.

EXAMPLE IX 2-ethylaminoethyl 10,11-dihydro-5H-dibenzo[a,d]cycloheptene-5-carboxylate hydrochloride (1) N-ethyl-N-(2-hydroxyethyl) - 10,11 - dihydro-5H-dibenzo[a,d]cycloheptene - 5 - carboxamide.—The carboxylic acid of Example I, 4(a) (4 g., 0.016 mole) was dissolved in 80 ml. of benzene and treated with 10 ml. of thionyl chloride. The mixture was refluxed for 18 hours and concentrated to a syrupy residue which was taken up in benzene and again concentrated to a syrup was dissolved in 50 ml. of benzene and 2.7 g. (0.032 mole) twice the amount of 2-ethylaminoethanol in 20 ml. of benzene was added at room temperature. The reaction mixture was stirred and refluxed for 6 hours, cooled and treated with 25 ml. of water. The mixture was filtered and after concentration of the filtrate an oil was obtained. After crystallization from ethyl-acetate the desired compound was obtained which melted at 114–115°; yield: 1.5 g.

*Analysis.*—For $C_{20}H_{23}NO_2$. Calc'd: C, 77.58; H, 7.79; N, 4.51. Found: C, 77.15; H, 7.49; N, 4.78.

(2) 2-ethylaminoethyl 10,11-dihydro - 5H - dibenzo-[a,d]cycloheptene - 5 - carboxylate hydrochloride.—N-ethyl-N-(2-hydroxyethyl) - 10,11 - dihydro-5H-dibenzo-[a,d]cycloheptene-5-carboxamide (1.9 g.) was suspended in 0.62 g. of concentrated hydrochloric acid. The mixture was warmed at 80° for 30 minutes, cooled and diluted with 20 ml. of ethanol. The mixture was concentrated in vacuo and the residue was recrystallized from a mixture of ethyl acetate and alcohol (7:3). The product melted at 182–183°; yield: 1.2 g.

*Analysis.*—For $C_{20}H_{24}ClNO_2$. Calc'd: C, 69.45; H, 6.99; N, 4.05. Found: C, 69.18; H, 7.12; N, 3.93.

What is claimed is:

1. A pharmaceutical composition in dosage unit form comprising 2 to 500 mg. of a compound of the formula

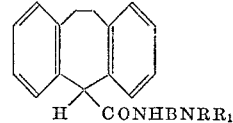

wherein:

B represents lower alkylene

R and $R_1$ are hydrogen, lower alkyl or when taken together with the adjacent nitrogen, piperidino, pyrrolidino, piperazino, N-(lower)alkylpiperazino, morpholino or thiomorpholino, the pharmaceutically acceptable acid addition salts or the pharmaceutically acceptable quaternary ammonium salts thereof, and a pharmaceutical carrier.

2. A pharmaceutical composition in dosage unit form comprising 2 to 500 mg. of N - 2(diethylaminoethyl)-10,11-dihydro - 5H - dibenz[a,d]cycloheptene-5-carboxamide, the pharmaceutically acceptable acid addition salts or the pharmaceutically acceptable quaternary ammonium salts thereof, and a pharmaceutical carrier.

3. A process for producing anticonvulsant and antiepileptic effects in warm-blooded animals which comprises administering to such animals 2 to 500 mg. of a compound of the formula

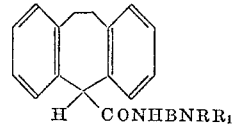

wherein:

B represents lower alkylene

R and $R_1$ are hydrogen, lower alkyl or when taken together with the adjacent nitrogen, piperidino, pyrrolidino, piperazino, N-(lower)alkylpiperazino, morpholino or thiomorpholino, the pharmaceutically acceptable acid addition salts or the pharmaceutically acceptable quaternary ammonium salts thereof, in a pharmaceutical carrier.

4. A process for producing anticonvulsant and antiepileptic effects in warm-blooded animals which comprises administering to such animals 2 to 500 mg. of N-2(diethylaminoethyl) - 10,11 - dihydro-5H-dibenz[a,d]cycloheptene-5-carboxamide, the pharmaceutically acceptable acid addition salts or the pharmaceutically acceptable quarternary ammonium salts thereof, in a pharmaceutical carrier.

References Cited

UNITED STATES PATENTS

| | | | |
|---|---|---|---|
| 2,776,299 | 1/1957 | Cusic | 260—328 |
| 3,038,896 | 6/1962 | Habicht | 260—239 |
| 3,142,681 | 6/1964 | Davis | 260—294.3 X |

ALBERT T. MEYERS, Primary Examiner

S. J. FRIEDMAN, Assistant Examiner

U.S. Cl. X.R.

424—248, 250, 267, 274, 285, 309, 324